United States Patent [19]

Brodt et al.

[11] Patent Number: 5,556,918

[45] Date of Patent: Sep. 17, 1996

[54] POLYMERIC MATERIALS SUITABLE AS DISPERSING RESINS

[75] Inventors: Gregor Brodt, Heppenheim; August Lehner, Rödersheim-Gronau; Alfred Lindner, Michelstadt; Hermann Graf, Mutterstadt; Michael Bobrich, Böhl-Iggelheim; Ria Kress, Ludwigshafen; Norbert Schneider, Altrip; Albert Kohl, Laumersheim; Werner Loch, Appenweier, all of Germany

[73] Assignee: BASF Magnetics GmbH, Mannheim, Germany

[21] Appl. No.: 370,977

[22] Filed: Jan. 10, 1995

[30] Foreign Application Priority Data

Jan. 12, 1994 [DE] Germany .......................... 44 00 594.6
Jan. 12, 1994 [DE] Germany .......................... 44 00 595.4

[51] Int. Cl.$^6$ ........................................................ C08F 8/30
[52] U.S. Cl. ............................................ 525/131; 525/123
[58] Field of Search ................................... 525/131, 123

[56] References Cited

FOREIGN PATENT DOCUMENTS 2125064  6/1975  Germany .
4141839  6/1993  Germany .
1340179  12/1973  United Kingdom .
1389930  4/1975  United Kingdom .

OTHER PUBLICATIONS

H. Fikentscher, Cellulose–Chemie 13(3) (1932), 58–64.

*Primary Examiner*—Bernard Lipman
*Attorney, Agent, or Firm*—Keil & Weinkauf

[57] ABSTRACT

Polymeric materials (I) are obtainable by reacting
1. a polymer II comprising
   a) from 80 to almost 100 mol % of a $C_1$–$C_{25}$-alkyl ester of an $\alpha,\beta$-unsaturated carboxylic acid,
   b) from 0 to 20 mol % of a further monomer,
   c) tetrahydrofuran hydroperoxide as polymerization initiator and, if required,
   d) a further polymerization initiator and/or regulator by means of which the majority of the polymer chains of the polymer II are terminated at one of their ends by a hydroxyl group,
2. with a polyfunctional isocyanate III to give a reaction product IV, the amount of isocyanate groups being from 1.2 to 3.0 mol per mol of hydroxyl groups of II, and
3. reacting IV with ammonia or with a compound V which has an amino function reactive toward isocyanates.

The polymeric materials can be used as dispersing resins for pigment-containing coatings, in particular for the production of magnetic recording materials.

5 Claims, No Drawings

POLYMERIC MATERIALS SUITABLE AS DISPERSING RESINS

The present invention relates to polymeric materials (I) which are suitable as dispersing resins and are obtainable by reacting 1. a polymer II comprising
   a) from 80 to almost 100 mol % of a $C_1$–$C_{25}$-alkyl ester of an $\alpha,\beta$-unsaturated carboxylic acid,
   b) from 0 to 20 mol % of a further monomer,
   c) tetrahydrofuran hydroperoxide as polymerization initiator and, if required,
   d) a further polymerization initiator and/or regulator by means of which the majority of the polymer chains of the polymer II are terminated at one of their ends by a hydroxyl group,
2. with a polyfunctional isocyanate III to give a reaction product IV, the amount of isocyanate groups being from 1.2 to 3.0 mol per mol of hydroxyl groups of II, and
3. reacting IV with ammonia or with a compound V which has an amino function reactive toward isocyanates.

The present invention furthermore relates to a process for the preparation of the polymeric materials I, their use as dispersing resins for pigment-containing coatings, pigment formulations comprising a pigment and a polymeric material I and magnetic recording materials containing magnetic pigments, which are provided with the mixtures I as dispersing resins.

Dispersions of inorganic pigments are used for many purposes, for example in the production of coating materials or of magnetic recording media and are described in many publications.

For the preparation of stable dispersions, macromolecular organic compounds, ie. dispersing resins, which are intended to insure good dispersing of the pigments in the dispersion, are often used as dispersants.

Frequently used dispersing resins are poly(meth)acrylates and reaction products or copolymers derived from them, for example polyurethane (meth)acrylates. Such polyurethane (meth)acrylates are generally prepared by reaction of hydroxyl-containing poly(meth)acrylates with polyisocyanates and subsequent conversion of the excess isocyanate groups. Thus, DE-A-2 125 064 describes a process for the preparation of polyurethane (meth)acrylates by polymerization of (meth)acrylates in an organic solvent, in particular toluene, and subsequent reaction of the polymers with organic polyisocyanates, in particular toluylene diisocyanate. DE-A-4 141 839 describes a polyurethaneurea (meth)acrylate which is prepared by polymerization of (meth)acrylates, reaction of the hydroxyl-containing polymer with polyisocyanates and reaction of the free isocyanate groups with ammonia or amines.

Although such dispersing agents exhibit good pigment dispersing behavior, their low level of saturation coating, which leads to insufficient stability of the dispersions, may result in pigment agglomeration on prolonged standing of the dispersions. Particularly in the case of use in magnetic recording media, such an agglomeration leads to surface defects (errors). Since, however, for reasons relating to production it is not always possible to rule out the fact that the dispersions will be stored for a long time, pigment dispersions having a long shelf life are required, particularly in the production of magnetic tapes.

It is an object of the present invention to provide polymeric materials which permit the preparation of, in particular, stable formulations of inorganic pigments, such as magnetic pigments.

We have found that this object is achieved by the polymeric materials I defined at the outset, a process for their preparation, pigment formulation comprising a pigment and a polymeric material I and magnetic recording materials which contain magnetic pigments which are provided with a polymeric material I.

Suitable monomers (a) of which the polymers II are for the most part composed are primarily esters of $\alpha,\beta$-unsaturated carboxylic acids of the formula

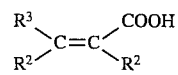

where $R^1$, $R^2$ and $R^3$ are each hydrogen or $C_1$–$C_4$-alkyl, acrylic acid and methacrylic acid being preferred. Mixtures of esters of different such carboxylic acids may also be used.

Suitable alcohol components of the alkyl esters, in addition to the $C_9$–$C_{25}$-alkanols, such as nonanol, stearyl alcohol and lauryl alcohol, are preferably the $C_1$–$C_8$-alkanols, in particular methanol and n-butanol, and mixtures of different such alkanols.

Suitable further comonomers (b) for synthesizing the polymers II are up to 20, preferably from 0 to 5, mol % of monomers by means of which the mechanical, thermal and chemical properties of the polymers which are composed only of the monomers (a) are modified but not substantially altered.

Such monomers are, for example, olefinically unsaturated aromatic hydrocarbons, such as styrene and $\alpha$-methylstyrene, unsaturated nitriles, such as acrylonitrile and methacrylonitrile, halogenated olefins, such as vinyl chloride, vinyl alcohol derivatives, such as vinyl acetate, and in particular monoesters of the stated $\alpha,\beta$-unsaturated carboxylic acids with polyhydric alcohols, such as ethanediol, propane-1,2-diol, propane-1,3-diol, the butanediols, glycerol and mixtures of these alcohols.

Small amounts of bifunctional monomers, by means of which slight crosslinking of the polymers is effected without influencing their properties as thermoplastics, for example butadiene, divinylbenzene and the polyesters of $\alpha,\beta$-unsaturated carboxylic acids with the abovementioned polyhydric alcohols, are also suitable.

The tetrahydrofuran hydroperoxide used according to the invention can be prepared in a manner known per se, by reacting tetrahydrofuran with an oxygen-containing gas such as air.

It is also possible to use, if required, further initiators and/or regulators, by means of which the polymer chains of II are terminated with a hydroxyl group. This is achieved by means of initiators which decompose to give a hydroxyl radical (OH radical) and/or by means of regulators which contain a hydroxyl function.

Initiators of this type are, for example, tert-butyl hydroperoxide, tetrahydrofuran hydroperoxide, cumoyl hydroperoxide and 2,2'-azobis(2-methyl-N-(2-hydroxyethyl)propionamide).

If the hydroxyl group is introduced only by means of a regulator, it is also possible to use other initiators, for example azobisisobutyronitrile, di-tert-butyl peroxide, dibenzoyl peroxide and tert-butyl peracetate.

Suitable regulators are aminoalcohols and in particular thioalkanols, such as 2-hydroxyethyl-3-mercaptopropionates, 3-hydroxypropanethiol and especially 2-hydroxyethanethiol (mercaptoethanol).

Mixtures of different initiators and/or regulators may also be used.

Initiators and regulators are used in the conventional amounts, as a rule from 0.1 to 4.8% by weight and from 0.1 to 5.0% by weight, respectively based on the mixture used, comprising the monomers (a) and (b). Since the amount of terminal groups of the polymer chains which originate from the initiators or regulators is only from about 0.05 to 4.5 mol %, these amounts were not considered when stating the quantitative composition of the polymer II, for the sake of greater clarity.

The polymers II can be prepared by all known polymerization methods, for example by mass polymerization, emulsion polymerization and, preferably, solution polymerization.

Suitable solvents are
hydrocarbons, such as toluene,
esters, such as ethyl acetate, and
ethers such as methyl tert-butyl ether,
and in particular cyclic ethers, such as tetrahydrofuran and dioxane.

The polymerization is carried out, as a rule, at elevated temperatures, preferably at from 40° to 125° C., resulting in reaction times of from 2 to 7 hours.

The polymers II can be isolated from the reaction mixture by known methods, for example by extraction or precipitation, or preferably used without isolation for further processing.

For the preparation of the reaction products IV, a polymer II is reacted with a polyfunctional isocyanate III or with a mixture of such isocyanates, the amount of isocyanate groups being from 1.2 to 3.0, preferably from 2.0 to 3.0, mol per mol of the hydroxyl group of II. The amount of hydroxyl groups in the prepared polymer II corresponds as a rule to a hydroxyl number of from 10 to 20 mg of KOH/g of II (according to DIN 53240), which in turn corresponds to from 0.17 to 0.36 mmol of hydroxyl groups per gram of II.

Open-chain isocyanates, such as hexamethylene diisocyanate, cyclic isocyanates, such as toluene diisocyanate, or polycyclic isocyanates, such as naphthalene diisocyanate, may advantageously be used as polyfunctional isocyanates.

The preparation of IV by reacting II with III can advantageously be carried out in the solvents suitable for the preparation of II.

The reaction can be carried out without a catalyst but is advantageously effected in the presence of a catalyst, such as metal salts, eg. dibutyltin laurate, tin octoate, lead octoate or titanium tetrabutoxylate, or tertiary amines, eg. triethylamine or 1,4-diazabicyclo[2.2.2]octane (DABCO).

The reaction is effected, as a rule, at elevated temperature, preferably at from 60° to 125° C., corresponding to reaction times of from about 0.3 to 4 hours.

The reaction products IV can be isolated from the reaction mixture by known methods, for example extraction or precipitation, or can preferably be used without isolation for further processing.

For the preparation of the polymers I, the reaction product IV is reacted with ammonia or with a compound V which has an amine function reactive toward isocyanates.

Primary amines, such as butylamine, propylamine, ethylenediamine or N,N'-bis(aminopropyl)ethylenediamine, secondary amines, such as diethylamine or piperidine, or aminoalcohols, such as diethanolamine, may advantageously be used as compound V.

Such amines are generally known.

The reaction can be carried out in the presence of catalysts, such as metal salts, in particular dibutyltin laurate, tin octoate, lead octoate or titanium tetrabutoxylate, or tertiary amines, such as triethylamine or diazabicyclooctane (DABCO), in amounts of from 1 to 500, in particular from 1 to 50, ppm by weight, based on IV, or preferably without catalyst.

The preparation of I by reacting IV with V can be carried out in the absence of a solvent or, advantageously, in the presence of an organic solvent, such as a hydrocarbon, in particular toluene, an ester, in particular ethyl acetate, an ether, in particular methyl tert-butyl ether, or preferably a cyclic ether, in particular tetrahydrofuran or dioxane. In some cases, water is also suitable.

The reaction is carried out as a rule at from 10° to 70° C., preferably from 20° to 40° C., resulting in reaction times of from about 5 to 60 minutes.

The polymer I can be isolated from the reaction mixture by known methods, for example by extraction or precipitation, or advantageously used in the reaction solution to prepare the suspension mentioned at the outset.

In accordance with their stepwise preparation, the novel polymers I consist of an organophilic polymeric main chain which has a plurality of branches at one of its ends, the majority of the outermost branches carrying acidic groups. These acidic groups have a strong affinity to a large number of pigments, in particular oxi-dic inorganic pigments, and therefore accumulate at the surface of said pigments. Consequently, pigment formulations having an organophilic coating are obtained from the pigments and the polymers I by conventional thorough mixing.

For the preparation of the pigment formulations, the pigments, in particular colored pigments and magnetic pigments, are mixed in a manner known per se with the polymeric materials I and, if required, additives in the absence of a solvent or, preferably, in the presence of an organic diluent, such as a hydrocarbon, in particular toluene, an ester, in particular ethyl acetate, a ketone, in particular methyl ethyl ketone or cyclohexanone, or an ether, in particular tetrahydrofuran, dioxane or methyl tertbutyl ether. In some cases, water is also suitable.

The pigment formulations may be isolated from the mixture by removing the diluent or preferably used without isolation for further processing.

The pigment formulations can be incorporated conveniently and without undesirable agglomeration in organic binders.

For this purpose, the pigment formulations can be mixed in a manner known per se with a binder and, if required, additives, in the absence of a solvent or preferably in the presence of an organic diluent, such as a hydrocarbon, in particular toluene, an ester, in particular ethyl acetate, a ketone, in particular methyl ethyl ketone or cyclohexanone, or an ether, in particular tetrahydrofuran, dioxane or methyl tert-butyl ether. In some cases, water is also suitable.

Polyurethanes, polyacrylates, polymethacrylates, polyacrylamide, vinyl polymers, such as polystyrene, polyvinyl chloride, polyvinyl acetate, polyvinyl propionate and polyacrylonitrile, cellulose-containing binders, such as cellulose ester, in particular cellulose nitrate, cellulose acetate, cellulose acetopropionate and cellulose acetobutyrate, phenoxy resins or epoxy resins are known to be suitable binders.

It is known that fillers, such as inorganic and organic pigments, eg. alumina, titanium dioxide, silica, carbon black, polyethylene and polypropylene, chalking inhibitors, eg. antimony oxide, and tin oxide, and thixotropic substances, eg. amorphous silica, are used as additives.

The mixtures comprising pigment formulation, binder and, if required, additives or solvent are usually used as coating materials.

The coating materials may contain the novel pigment formulations alone or as a mixture with other pigments or pigment formulations.

Such coating materials are particularly important for the production of magnetic recording materials. For this purpose, pigment formulations comprising a magnetic pigment and a polymeric material I, with or without fillers, can be dispersed in a manner known per se in a mixture of a solvent or diluent, a binder and further additives, such as a lubricant, and the resulting dispersion can be applied to a nonmagnetic substrate. After orientation of the ferromagnetic pigments in a strong magnetic field, the further processing can be carried out in a conventional manner, for example by removing the solvent and, if required, curing the binder, with final calendering.

Suitable magnetic pigments are the conventional oxidic pigments, such as $\gamma$-$Fe_2O_3$, $\gamma$-$Fe_3O_4$ and $CrO_2$, or metallic pigments, such as Fe, Co and Ni. As is generally known, these pigments may contain further chemical elements or compounds.

As usual, water, ethers, such as tetrahydrofuran or dioxane, ketones, such as methyl ethyl ketone or cyclohexanone, esters, such as ethyl acetate, or hydrocarbons, such as alkanes or aromatics, or mixtures of such compounds may be used as solvents or diluents.

Carboxylic acids of 10 to 20 carbon atoms, in particular stearic acid or palmitic acid, or derivatives of carboxylic acids, such as their salts, esters and amides, are usually used as lubricants.

The conventional rigid or flexible substrates, in particular films of linear polyesters, such as polyethylene terephthalate, which are in general from 4 to 200 μm, in particular from 6 to 36 μm, thick, are used as nonmagnetic and nonmagnetizable substrates.

In the production of magnetic recording materials, a plurality of magnetic layers, of which at least one layer contains a novel pigment formulation, can be applied to the substrate.

In the examples and comparative experiments which follow, parts and percentages are by weight, unless stated otherwise. Parts by volume bear the same relation to parts by weight as that of the liter to the kilogram.

The polyurethane elastomer used as 13% strength solution in tetrahydrofuran in the examples was prepared according to EP 0 002 241 and had a K value of 58 (1% strength in dimethylformamide) according to H. Fikentscher, Cellulose-Chemie 13(3) (1932), 58–64.

Polymer A 17,482 parts of tetrahydrofuran were heated to the boil in a heatable reaction vessel having a capacity of 100,000 parts by volume and equipped with a stirrer and reflux condenser, while continuously passing in air diluted with nitrogen and having an oxygen content of 5.5% by volume. A mixture of 15,903 parts of methyl methacrylate, 15,903 parts of n-butyl methacrylate, 403 parts of mercaptoethanol and 80 parts of azobisisobutyronitrile was metered in over 2 hours. After stirring had been carried out for 30 minutes, a mixture of 132 parts of azobisisobutyronitrile and 257 parts of mercaptoethanol, dissolved in 1,532 parts of tetrahydrofuran, was added in the course of a further 2 hours. After 2 hours, a mixture of 3,384 parts of tetrahydrofuran, 24 parts of hexamethylene diisocyanate, 2,909 parts of the biuret of hexamethylene diisocyanate and 1,430 parts of a polyisocyanate having an average functionality of 4.8 was added in the course of 15 minutes. After stirring had been carried out for 30 minutes, 200 parts of dibutyltin dilaurate per 1,000,000 parts of the total amount were added. After 1 hour, gaseous ammonia was bubbled through the solution until no further temperature increase was observed. The excess ammonia was then removed by passing through nitrogen. The polymer mixture contained 28% by weight of component 1 and had a K value (1% strength in diemthylformamide) of 17.8 according to Fikentscher.

Comparative Polymer A'

17,482 parts of toluene were heated to the boil in a heatable reaction vessel having a capacity of 100,000 parts by volume and equipped with a stirrer and reflux condenser, while continuously passing in air diluted with nitrogen and having an oxygen content of 5.5% by volume. A mixture of 15,903 parts of methyl methacrylate, 15,903 parts of n-butyl methacrylate, 403 parts of mercaptoethanol and 80 parts of azobisisobutyronitrile was metered in over 2 hours. After stirring had been carried out for 30 minutes, a mixture of 132 parts of azobisisobutyronitrile and 257 parts of mercaptoethanol, dissolved in 1532 parts of toluene, was added in the course of a further 2 hours. After 2 hours, a mixture of 3,384 parts of toluene, 24 parts of hexamethylene diisocyanate, 2,909 parts of the biuret of hexamethylene diisocyanate and 1,430 parts of a polyisocyanate having an average functionality of 4.8 was added in the course of 15 minutes. After stirring had been carried out for 30 minutes, 200 parts of dibutyltin dilaurate per 1,000,000 parts of the total amount were added. After 1 hour, gaseous ammonia was bubbled through the solution until no further temperature increase was observed. The excess ammonia was then removed by passing through nitrogen.

Polymer B 1,399 parts of tetrahydrofuran and 16,083 parts of toluene were heated to the boil in a heatable reaction vessel having a capacity of 100,000 parts by volume and equipped with a stirrer and reflux condenser, while continuously passing in air diluted with nitrogen and having an oxygen content of 4.5% by volume. A mixture of 15,903 parts of methyl methacrylate, 15,903 parts of n-butyl methacrylate, 403 parts of mercaptoethanol and 80 parts of azobisisobutyronitrile was metered in over 2 hours. After stirring had been carried out for 30 minutes, a mixture of 132 parts of azobisisobutyronitrile and 257 parts of mercaptoethanol, dissolved in 123 parts of tetrahydrofuran and 1,409 parts of toluene, was added in the course of a further 2 hours. After 2 hours, a mixture of 271 parts of tetrahydrofuran, 3,113 parts of toluene, 24 parts of hexamethylene diisocyanate, 2,909 parts of the biuret of hexamethylene diisocyanate and 1,430 parts of a polyisocyanate having an average functionality of 4.8 was added in the course of 15 minutes. After stirring had been carried out for 30 minutes, 200 parts of dibutyltin dilaurate per 1,000,000 parts of the total amount were added. After 1 hour, gaseous ammonia was bubbled through the solution until no further temperature increase was observed. The excess ammonia was then removed by passing through nitrogen. The polymer mixture contained 12% by weight of component 1.

Polymer C 17,482 parts of tetrahydrofuran were heated to the boil in a heatable reaction vessel having a capacity of 100,000 parts by volume and equipped with a stirrer and reflux condenser, while continuously passing in air diluted with nitrogen and having an oxygen content of 5% by volume. A mixture of 15,903 parts of methyl methacrylate, 15,903 parts of n-butyl methacrylate, 403 parts of mercaptoethanol and 80 parts of azobisisobutyronitrile was metered in over 2 hours. After stirring had been carried out for 30 minutes, a mixture of 132 parts of azobisisobutyronitrile and 257 parts of mercaptoethanol, dissolved in 1532 parts of tetrahydrofuran, was added in the course of a further 2 hours. After 2 hours, a mixture of 3,384 parts of tetrahydrofuran, 24 parts of hexamethylene diisocyanate, 2,909 parts of the biuret of hexamethylene diisocyanate and 1,430 parts of a polyisocyanate having an average functionality of 4.8 was added in the course of 15 minutes. After stirring had been carried out for 30 minutes, 200 parts of dibutyltin dilaurate per 1,000,000 parts of the total amount were added. After 1 hour, 2,500 parts of N,N'-bis(aminopropyl)ethylenediamine and 15,079 parts of tetrahydrofuran were added. The polymer mixture contained 24% by weight of component 1.

Comparative Polymer B'

17,482 parts of toluene were heated to the boil in a heatable reaction vessel having a capacity of 100,000 parts by volume and equipped with a stirrer and reflux condenser, while continuously passing in air diluted with nitrogen and having an oxygen content of 5.0% by volume. A mixture of 15,903 parts of methyl methacrylate, 15,903 parts of n-butyl methacrylate, 403 parts of mercaptoethanol and 80 parts of azobisisobutyronitrile was metered in over 2 hours. After stirring had been carried out for 30 minutes, a mixture of 132 parts of azobisisobutyronitrile and 257 parts of mercaptoethanol, dissolved in 1,532 parts of toluene, was added in the course of a further 2 hours. After 2 hours, a mixture of 3,384 parts of toluene, 24 parts of hexamethylene diisocyanate, 2,909 parts of the biuret of hexamethylene diisocyanate and 1,403 parts of a polyisocyanate having an average functionality of 4.8 was added in the course of 15 minutes. After stirring had been carried out for 30 minutes, 200 parts of dibutyltin dilaurate per 1,000,000 parts of the total amount were added. After 1 hour, 2,500 parts of N,N'-bis(aminopropyl)ethylenediamine and 15,079 parts of toluene were added.

Comparative Polymer C'

17,482 parts of tetrahydrofuran were heated to the boil in a heatable reaction vessel having a capacity of 100,000 parts by volume and equipped with a stirrer and reflux condenser, while continuously passing in nitrogen. The tetrahydrofuran contained <2 ppm of tetrahydrofuran hydroperoxide. A mixture of 15,903 parts of methyl methacrylate, 15,903 parts of n-butyl methacrylate, 403 parts of mercaptoethanol and 80 parts of azobisisobutyronitrile was metered in over 2 hours. After stirring had been carried out for 30 minutes, a mixture of 132 parts of azobisisobutyronitrile and 257 parts of mercaptoethanol, dissolved in 1,532 parts of tetrahydrofuran, was added in the course of a further 2 hours. After 2 hours, a mixture of 3,384 parts of tetrahydrofuran, 24 parts of hexamethylene diisocyanate, 2,909 parts of the biuret of hexamethylene diisocyanate and 1,430 parts of a polyisocyanate having an average functionality of 4.8 was added in the course of 15 minutes. After stirring had been carried out for 30 minutes, 200 parts of dibutyltin dilaurate per 1,000, 000 parts of the total amount were added. After 1 hour, 2,500 parts of N,N'-bis(aminopropyl)ethylenediamine and 15,079 parts of tetrahydrofuran were added. The polymer mixture contained 4% by weight of component 1.

Polymer D 17,482 parts of tetrahydrofuran were heated to the boil in a heatable reaction vessel having a capacity of 100,000 parts by volume and equipped with a stirrer and reflux condenser, while continuously passing in air diluted with nitrogen and having an oxygen content of 5.0% by volume. A mixture of 15,903 parts of methyl methacrylate, 15,903 parts of n-butyl methacrylate, 403 parts of mercaptoethanol and 80 parts of azobisisobutyronitrile was metered in over 2 hours. After stirring had been carried out for 30 minutes, a mixture of 132 parts of azobisisobutyronitrile and 257 parts of mercaptoethanol, dissolved in 1,532 parts of tetrahydrofuran, was added in the course of a further 2 hours. After 2 hours, a mixture of 3,384 parts of tetrahydrofuran, 24 parts of hexamethylene diisocyanate, 2,909 parts of the biuret of hexamethylene diisocyanate and 1,430 parts of a polyisocyanate having an average functionality of 4.8 was added in the course of 15 minutes. After stirring had been carried out for 30 minutes, 200 parts of dibutyltin dilaurate per 1,000, 000 parts of the total amount were added. After 1 hour, 2,572 parts of 3-trimethoxysilylpropylamine and 15,079 parts of tetrahydrofuran were added. The polymer mixture contained 26% by weight of component 1.

Comparative Polymer D'

17,482 parts of toluene were heated to the boil in a heatable reaction vessel having a capacity of 100,000 parts by volume and equipped with a stirrer and reflux condenser, while continuously passing in air diluted with nitrogen. A mixture of 15,903 parts of methyl methacrylate, 15,903 parts of n-butyl methacrylate, 403 parts of mercaptoethanol and 80 parts of azobisisobutyronitrile was metered in over 2 hours. After stirring had been carried out for 30 minutes, a mixture of 132 parts of azobisisobutyronitrile and 257 parts of mercaptoethanol, dissolved in 1,532 parts of toluene, was added in the course of a further 2 hours. After 2 hours, a mixture of 3,384 parts of toluene, 24 parts of hexamethylene diisocyanate, 2,909 parts of the biuret of hexamethylene diisocyanate and 1,430 parts of a polyisocyanate having an average functionality of 4.8 was added in the course of 15 minutes. After stirring had been carried out for 30 minutes, 200 parts of dibutyltin delaurate per 1,000,000 parts of the total amount were added. After 1 hour, 2,572 parts of 3-trimethoxysilylpropyl-amine and 15,079 parts of toluene were added.

EXAMPLE 1

1,000 parts by weight of a chromium dioxide having a mean particle length of 0.5 μm and a length/width ratio of 4:1 were dispersed together with 88 parts by weight of a 13% strength solution of a polyurethane elastomer, 86 parts by weight of a 20% strength solution of a polyvinyl formal consisting of 82% by weight of vinyl formal units, 12% by weight of vinyl acetate units and 6% by weight of vinyl alcohol units, 69 parts by weight of Polymer A (50% strength in tetrahydrofuran), 10 parts by weight of linseed oil fatty acid and 970 parts by weight of 1:1 tetrahydrofuran/dioxane for 72 hours in a steel ball mill of conventional design, containing steel balls as the grinding medium.

Thereafter, a mixture of 864 parts by weight of the 13% strength polyurethane elastomer solution, 57 parts by weight of the 20% strength polyvinyl formal solution, and 28.8 parts by weight of 1:1 tetrahydrofuran/dioxane was added to this dispersion, and dispersing was continued for a further 2 hours.

19.9 parts by weight of a 50% strength tetrahydrofuran solution of a triisocyanate obtained from 3 mol of toluylene diisocyanate and 1 mol of trimethylolpropane were added to 1,000 parts by weight of the dispersion thus obtained, and the mixture was then filtered through a filter having a pore size of 3 μm. After the dispersion had been applied to a 15 μm thick polyester film and after the coated film had been passed through a magnetic field to orient the magnetic particles, said film was calendered at from 50° to 80° C. by being passed between heated rollers.

Comparative Example 1

The procedure was as described in Example 1, except that Polymer A was replaced by Comparative Polymer A'.

EXAMPLE 2

800 parts by weight of a chromium dioxide having a mean particle length of 0.5 μm, a length/width ratio of 4:1 and a coercive force Hc of 41 kA/m and 200 parts by weight of a cobalt-doped γ-iron(III) oxide were dispersed together with 51.5 parts by weight of a 13% strength solution of a polyurethane elastomer, 150 parts by weight of a 20% strength solution of a polyvinyl formal consisting of 82% of vinyl formal units, 20% of vinyl acetate units and 6% of vinyl alcohol units, 54.4 parts by weight of Polymer B (50% strength), 10 parts by weight of linseed oil fatty acid and 1,311 parts by weight of 1:1 tetrahydrofuran/dioxane for 72 hours in a steel ball mill of conventional design, containing steel balls as the grinding medium.

Thereafter, 1,025 parts by weight of 13% strength polyurethane elastomer solution were added to this dispersion, and dispersing was continued for a further 2 hours.

12.2 parts by weight of a 50% strength tetrahydrofuran solution of a triisocyanate obtained from 3 mol of toluylene diisocyanate and 1 mol of trimethylpropane were added to 1,000 parts by weight of the dispersion thus obtained, and the mixture was then filtered through a filter having a pore size of 3 μm. After the dispersion had been applied to a 15 μm thick polyester film and after the coated film had been passed through a magnetic field to orient the magnetic particles, said film was calendered at from 50° to 80° C. by being passed between heated rollers under pressure.

Comparative Example 2

The procedure was as described in Example 2, except that Polymer B was replaced by Comparative Polymer A'.

EXAMPLE 3

The procedure was as described in Example 2, except that 205 parts by weight of the 13% strength polyurethane elastomer solution and 73 parts by weight of Polymer C (50% strength in tetrahydrofuran) were used instead of 150 parts by weight of polyvinyl formal, and 24.2 parts by weight of the triisocyanate solution according to Example 2 were employed.

Comparative Example 3

The procedure was as described in Example 3, except that Polymer C was replaced by Comparative Polymer B'.

Comparative Example 4

The procedure was as described in Example 3, except that Polymer C was replaced by Comparative Polymer C'.

EXAMPLE 4

3,000 g of tetrahydrofuran, 608 g of a solution of a polyurethane elastomer having a hydroxyl number of 55 mg KOH/g (Polymer D in DE-A-3 227 164.6), 50% strength in tetrahydrofuran, 84 g of Polymer D, 340 g of a 20% strength solution of a polyvinyl formal in tetrahydrofuran, 2,000 g of a ferromagnetic chromium dioxide having a coercive force of Hc of 43 kA/m, a mean needle length of 0.24 μm and a BET surface area of 28 m$_2$/g, 30 g of zinc oleate, 15 g of stearic acid and 30 g of methyl stearate were introduced into a stirred ball mill having a capacity of 1.5 parts by volume and containing 2.7 kg of ceramic balls having a diameter of from 1.0 to 1.5 mm, and the batch was dispersed in the course of 12 hours with circulation. The dispersion was then filtered under pressure, 0.04 part of a solution of a triisocyanate of 3 mol of toluylene diisocyanate and 1 mol of trimethylpropane, 50% strength in tetrahydrofuran, was added per part of the dispersion while stirring, and immediately thereafter the mixture was applied to a 15 μm thick polyethylene terephthalate film. The coated film was passed through a magnetic field to orient the magnetic particles and then dried at from 50° to 80° C. and calendered by being passed between heated rollers under pressure (nip pressure 200 kg/cm).

Comparative Experiment 5

The procedure was as described in Example 4, except that Polymer D was replaced by Comparative Polymer D'.

Table 1

Gloss Measurement

The gloss was determined using a Dr. Lange reflectometer at an angle of 60° in a manual coating test. The higher the gloss values, the better is the result of the dispersing.

For this purpose, the dispersions prepared using the various polymers were each applied to a 24 μm thick polyethylene terephthalate film by means of a 40 μm knife coater at a take-off speed of about 1 m/s.

| Storage | Gloss | | | | | | | | |
|---|---|---|---|---|---|---|---|---|---|
| time | B1 | V1 | B2 | V2 | B3 | V3 | V4 | B4 | V5 |
| 0 d | 105 | 105 | 98 | 99 | 115 | 112 | 113 | 108 | 110 |
| 1 d | 105 | 103 | 98 | 97 | 112 | 107 | 110 | 108 | 102 |
| 3 d | 100 | 96 | — | — | 110 | 99 | 100 | 105 | 95 |
| 7 d | 100 | 86 | 95 | 82 | 107 | 88 | 90 | 101 | 90 |
| 10 d | 98 | 79 | 94 | 75 | | | | 100 | 83 |
| 14 d | 95 | 65 | | | | | | | |
| 28 d | 94 | 60 | | | | | | | |
| 56 d | 93 | 60 | | | | | | | |

B — Example
V — Comparative Example

Table 2

Number of Errors in Dropouts/Minute

To determine the number of errors, the dispersions were cast after various storage times and processed to give video tapes.

| Storage time | Number of errors | |
|---|---|---|
| | B1 | V1 |
| 0 d | 21 | 20 |
| 1 d | 21 | 22 |
| 3 d | 23 | 28 |
| 7 d | 25 | 45 |
| 14 d | 30 | 98 |
| 28 d | 28 | 101 |

Table 3

Surface Evaluation in Terms of Nodule Formation

Here, the dispersions were each applied to a 24 μm thick polyethylene terephthalate film by means of a 40 μm knife coater at a take-off speed of about 1 m/s, and the surface was assessed.

| Storage time | Nodules | | | | | | |
|---|---|---|---|---|---|---|---|
| | B1 | V1 | B2 | V2 | B3 | V3 | B4 |
| 0 d | none | none | none | none | none | many | many |
| 7 d | none | many | none | few | none | many | many |

Table 4

Orientation Mr/Mm

Here, the orientation Mr/Mm of tapes obtained from the dispersions was determined by measurements of the magnetic values in a magnetic field of 360 kA/m.

(Mr—residual induction, Mm—residual magnetization)

| Storage time | Orientation Mr/Mm | | | | | | | | |
|---|---|---|---|---|---|---|---|---|---|
| | B1 | V1 | B2 | V2 | B3 | V3 | V4 | B4 | V5 |
| 0 d | 0.90 | 0.90 | 0.89 | 0.90 | 0.91 | 0.91 | 0.90 | 0.91 | 0.90 |
| 1 d | 0.50 | 0.90 | 0.89 | 0.88 | 0.91 | 0.90 | 0.89 | 0.91 | 0.91 |
| 3 d | 0.89 | 0.88 | — | — | 0.90 | 0.87 | 0.88 | 0.90 | 0.87 |
| 10 d | 0.89 | 0.83 | 0.88 | 0.81 | 0.90 | 0.83 | 0.83 | 0.89 | 0.81 |
| 28 d | 0.88 | 0.70 | — | — | — | — | — | — | — |

The storage time is understood as meaning the time from the preparation to the processing of the dispersions.

We claim:

1. A polymeric material (I) suitable as a dispersing resin and obtained by the process of reacting
1) a polymer II comprising
   a) from 80 to almost 100 mol % of a $C_1$–$C_{25}$-alkyl ester of an α,β-unsaturated carboxylic acid,
   b) from 0 to 20 mol % of a further monomer,
   c) tetrahydrofuran hydroperoxide as polymerization initiator and, optionally,
   d) a further polymerization initiator or regulator by means of which the majority of the polymer chains of the polymer II are terminated at one of their ends by a hydroxyl group,
2) reacting the polymer II with a polyfunctional isocyanate III to give a reaction product IV, the amount of isocyanate groups being from 1.2 to 3.0 mol per mol of hydroxyl groups of II, and
3) reacting the free isocyanate groups of IV with ammonia or with a compound V which has an amino function reactive toward isocyanates.

2. A polymeric material (I) as defined in claim 1, wherein the α,β-unsaturated carboxylic acid has the formula

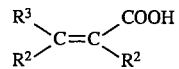

where $R^1$, $R^2$ and $R^3$ are each hydrogen or $C_1$–$C_4$-alkyl.

3. A polymeric material (I) as defined in claim 1, wherein the α,β-unsaturated carboxylic acid is acrylic acid or methacrylic acid.

4. A polymeric material (I) as defined in claim 1, wherein the free isocyanate groups of IV are reacted with ammonia.

5. A polymeric material (I) as defined in claim 1, wherein the free isocyanate groups of IV are reacted with butylamine, propylamine, ethylenediamine, N,N'-bis(aminopropyl)ethylenediamine, diethylamine, piperidine, or diethanolamine.

* * * * *